United States Patent Office.

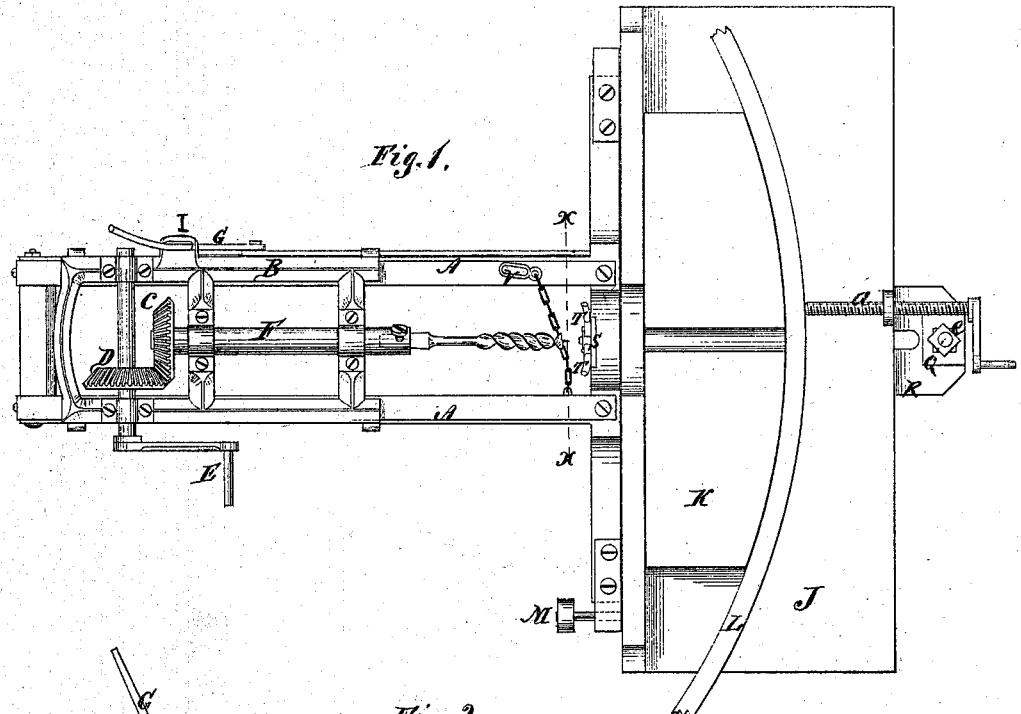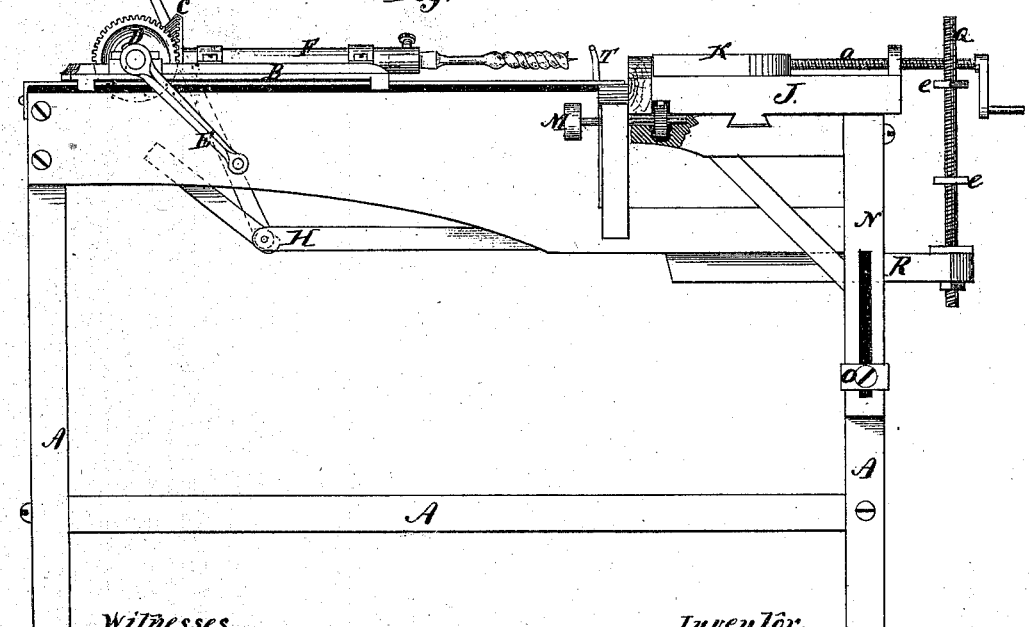

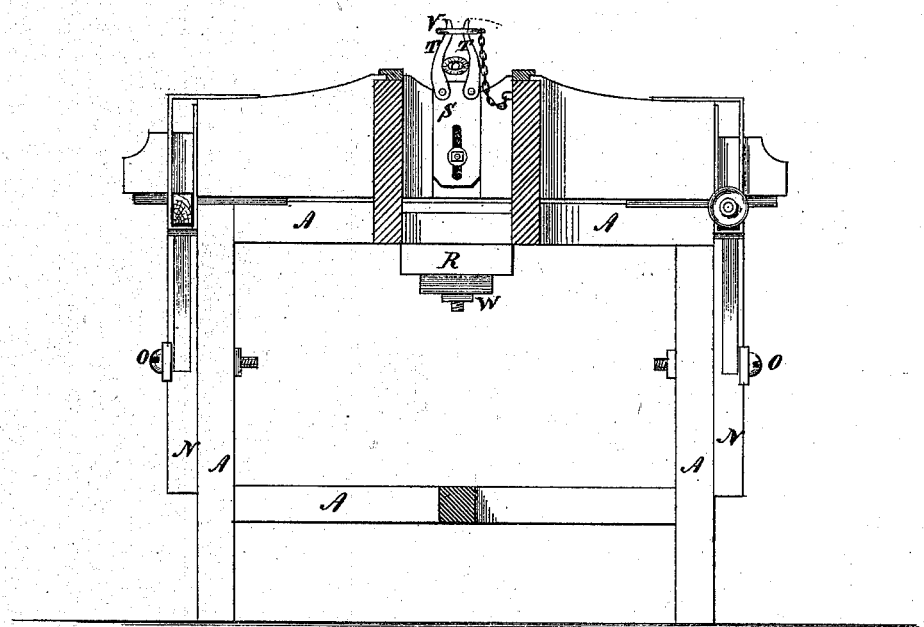

JOHN HENRY PARDIECK, OF ACTON, INDIANA, ASSIGNOR TO HIMSELF AND SAMUEL M. BROWN, OF SAME PLACE.

Letters Patent No. 112,372, dated March 7, 1871.

IMPROVEMENT IN BORING MACHINES.

The Schedule referred to in these Letters Patent and making part of the same.

I, JOHN HENRY PARDIECK, of Acton, in the county of Marion and State of Indiana, have invented certain Improvements in Boring Machines, of which the following is a specification.

Nature and Objects of the Invention.

The first part of my invention relates to boring fellies and other parts of the wood-work of wagons, and it consists in the arrangement of an adjustable table, on which to place the articles to be bored, combined with an adjustable horizontal boring machine, having for its object to bore fellies and other parts of the wood-work of wagons with greater facility and precision than heretofore.

The second part of the invention relates to boring hubs and tenoning spokes, and it consists in the arrangement of an adjustable holder for the hub, and also for the spoke, combined with the boring apparatus, having for its object to bore hubs and tenon spokes with more precision and greater rapidity than has heretofore been achieved by hand-machines.

The arrangement of the several parts is such as to combine in one simple and efficient machine the requisites for the purposes above mentioned.

Description of the Accompanying Drawing.

Figure 1 is a top view of a boring machine embodying my invention.

Figure 2 is a side elevation of the same.

Figure 3 is a transverse vertical section on the line $x\ x$, fig. 1.

A is the frame of the machine, to which all the other parts are attached.

B is a horizontal sliding frame of metal or other suitable material, in which is hung the gearing C D and crank E, for giving rotary motion to the auger-shaft F, all constructed and arranged in the usual manner.

The frame B is moved by means of the lever G, which is pivoted by its lower end at H, and passes up through an eye, I, on the side of the frame, as shown.

J is a table, adjusted both vertically and longitudinally, upon which to lay fellies, or other articles to be bored. When used for fellies, the movable rest K, formed to fit the inside thereof, is placed on the table as shown in figs. 1 and 2.

L indicates a felly in position by the screw $a$. The table is adjusted longitudinally by means of a rack on the under side (not shown in the drawing) and a pinion operated by the hand-wheel M, and vertically by means of the slotted legs N, through which set-screws, O, pass into the legs A of the frame.

For convenience of boring hubs, and also for tenoning spokes, I fit an upright rod, Q, on which to place the hub, as shown in fig. 1, said rod being a screw furnished with nuts $e\ e$, in order to adjust the hub vertically in a horizontal adjustable sliding-bar R, which is secured to the under side of the table by a set screw, W, and by which the hub may be arranged at the proper distance from the auger for tenoning spokes of large or small wheels.

In order to hold the spokes firmly while cutting the tenons on the end, I have devised the clamp composed of the vertically-adjustable plate S, to the upper end of which are hinged the arms T, between which the spokes are held, as shown in figs. 1 and 3. A link, V, serves to hold the arms T firmly to the spoke.

Claims.

I claim as my invention—

1. The boring and spoke-tenoning machine, composed of the vertically and horizontally-adjustable table J, provided with the movable rest K, boring apparatus B C D E F G, hub-holder Q $e$ $e$ R, and spoke-holder S T V, all constructed and arranged substantially as and for the purpose set forth.

2. The vertical rod Q, provided with nuts $e\ e$, and fixed in the adjustable bar R, in combination with the boring apparatus specified in the first clause of claim, and the spoke-holding device, composed of the vertically-adjustable plate S, arms T, and link V, arranged substantially as and for the purpose set forth.

J. HENRY PARDIECK.

Witnesses:
DAN. W. KUEFLER,
O. F. MAYHEW.